(12) United States Patent
Hopp

(10) Patent No.: US 8,217,994 B2
(45) Date of Patent: Jul. 10, 2012

(54) STEREO-PROJECTION CONTROL SYSTEM

(76) Inventor: Armin Hopp, Overath (DE)

( * ) Notice: Subject to any disclaimer, the term of this patent is extended or adjusted under 35 U.S.C. 154(b) by 1263 days.

(21) Appl. No.: 10/578,760

(22) PCT Filed: Nov. 7, 2004

(86) PCT No.: PCT/DE2004/002469
§ 371 (c)(1),
(2), (4) Date: May 5, 2006

(87) PCT Pub. No.: WO2005/046251
PCT Pub. Date: May 19, 2005

(65) Prior Publication Data
US 2007/0080959 A1   Apr. 12, 2007

(30) Foreign Application Priority Data
Nov. 7, 2003   (DE) .................................. 103 52 492

(51) Int. Cl.
H04N 13/04   (2006.01)
(52) U.S. Cl. ........................................................ 348/51
(58) Field of Classification Search .................... 348/43, 348/51, 54–58
See application file for complete search history.

(56) References Cited

U.S. PATENT DOCUMENTS
4,954,890 A   9/1990 Park
5,497,197 A   3/1996 Gove et al.
6,049,317 A   4/2000 Thompson et al.
2002/0021261 A1   2/2002 Werner
2002/0154145 A1*  10/2002 Isakovic et al. ............... 345/643

FOREIGN PATENT DOCUMENTS
DE           10160160 A1   6/2003
WO   WO-95/18511 A1   7/1995
WO   WO-02/076107 A1   9/2002

OTHER PUBLICATIONS

International Preliminary Report on Patentability issued in related International Application No. PCT/DE2004/002469, and its English language translation.

* cited by examiner

Primary Examiner — Timothy J Henn
(74) Attorney, Agent, or Firm — Connolly Bove Lodge & Hutz LLP

(57) ABSTRACT

The invention relates to a DLP-projector for the active projection of stereoscopic images, with the projector comprising a DMD, at least a first driver circuit interacting with a memory (6) and controlling at least one DMD (4), and at least a first signal input (1) for the input of image data of at least a first image channel and a second image channel. In order to enable simplest possible construction of such a DLP-projector, there are provided: A second driver circuit interacting with a memory (6'); and a switching device (7), which is connected on one side with the two driver circuits and on the other side with at least the one DMD (4); with the first driver circuit processing image data of the first image channel and the second driver circuit processing image data of the second image channel; and the switching device directing to the DMD (4) alternately one or more images or frames from the first driver circuit and one or more images or frames from the second driver circuit.

11 Claims, 1 Drawing Sheet

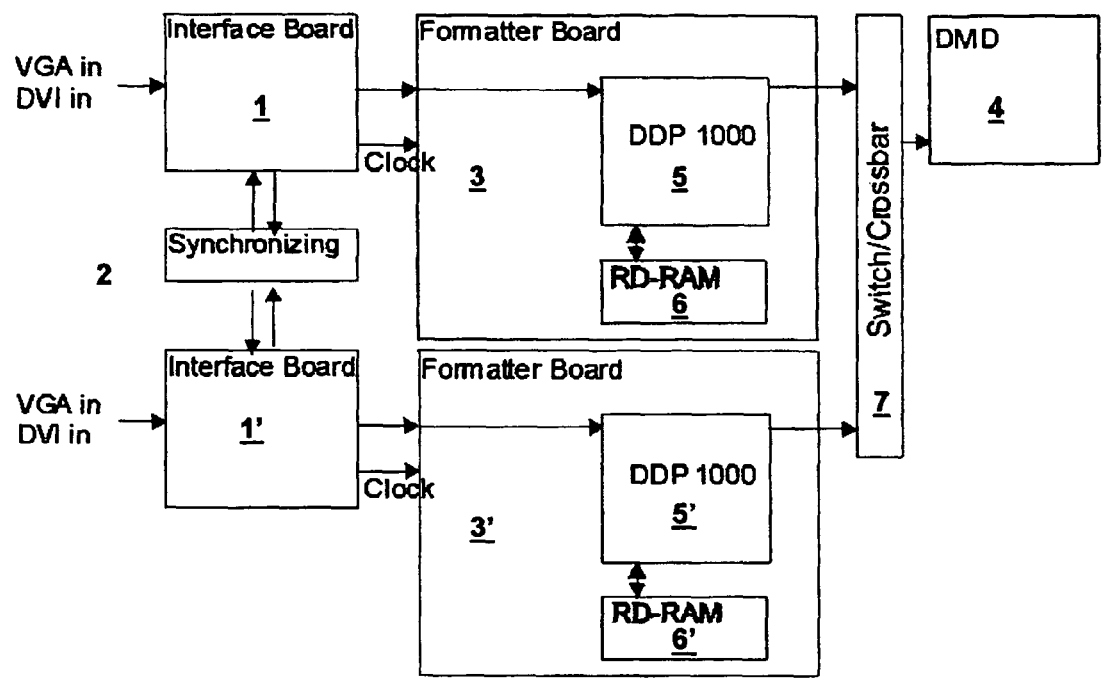

STEREO-PROJECTION CONTROL SYSTEM

FIELD OF THE INVENTION

The invention relates to a DLP-projector for the active projection of stereoscopic images. The projector includes a DMD, at least a first driver circuit interacting with a memory and serving for controlling at least one DMD, and at least a first signal input for the input of image data of at least a first image channel and a second image channel.

BACKGROUND

For the stereoscopic presentation of images, there are two basic methods, namely active projection and passive projection.

In the case of passive projection, the first and second images of a stereoscopic image pair are presented simultaneously on a projection screen. Separation of the images is done using filters, for example polarizing filters. The observer wears glasses with appropriate filters, in order to see one image with one eye and the other image with the other eye.

In the case of the active projection technology, the two images are presented sequentially, thus, one after the other in time. For observing the two images, shutter-glasses are used, which alternately close the view for one of the two eyes, in unison with the changing of the images. In order to be able to view the images flicker-free, high repetition frequencies are required.

WO 95/18511 discloses a method and apparatus for effecting the recording and active playback of stereoscopic video images of observed scenes, wherein the recording, or storing, of images in conventional data storage media is made easier by the performing of a half-image detection before, or after, the recording, and by determining therewith the association of the relevant half-images to the corresponding frames of left and right channels, or the association of two frames in parallel channels, as the case may be. In this system, complete images of the right and left channels are alternately presented, one after the other, on a CRT-monitor. U.S. Pat. No. 4,954,890 discloses a passive projection system with two mutually separated, optical systems, each having a light source and an LCD-panel, which cast left and right images onto a display screen, wherein a right, current image is placed on a left, previous image, and vice versa, in order to improve the brightness of the image, especially in comparison to conventional, previously known, active systems, in which right and left images are presented alternately on a CRT-monitor. To this end, there is connected before the image storing electronics of the LCD-panel a demultiplexer, which distributes the signals of a signal source channel-wise onto the image storer. Disadvantageous in this system is the requirement for two LCD-panels and the relatively high costs associated therewith.

The image repetition rate of LCD-panels is limited, as a rule, to 60 Hz, due to their internal, image storing electronics, so that they are not suited for active projection of stereoscopic images.

DLP-projectors are known. DLP stands for Digital Light Processing. Basis of this technology is an about thumbnail-sized chip, a so-called Digital Mirror Device (DMD), developed by the firm Texas Instruments. Depending on image resolution, typically 800.times.600, 1024.times.768 or 1280.times.1024, or even higher, microscopically small mirrors are placed on the chip. For every individual pixel, the mirrors reflect a projection light coming from a light source, so that an image identical with a data source is formed on a projection surface. The mirrors can be shifted electronically up to 50,000 times in a second, so that all pixels can be turned on and off up to 25,000 times in a second. Installed between the mirrors and the light source is a rapidly rotating, color wheel, which typically produces 3, or 4, color images in the sequence red/blue/green, or red/blue/green/white, as the case may be. Due to the rapid repetition frequency and the inertia of the human eye, these are perceived as a one image.

Various efforts have been made towards using such DLP-projectors for the projection of stereoscopic images.

DE 1 016 01 60A1 discloses a method for active, stereoscopic projection using a DLP projector of the above-described type. The projector has a first driver circuit for controlling a DMD. The driver circuit cooperates with, in each case, two memory components, which, in each case, have two memory banks and are connected with the driver circuit via a switching device, a so-called crossbar, which controls the data flow from the memory banks to the DLP-memory-bus-system. In such case, the image data of an image of a first or second image channel are written to, or read-out from, the separate memory banks during four color-wheel rotations, selectively in a certain cycle. The writing of the memory banks with the image data of the first and second image channels requires the duration of four color-wheel rotations. And, these data, during four color-wheel rotations, are, in each case, twice read-out of the memory banks and fed via the driver circuit to the DMD. Serving as signal input of the DLP-projector is a so-called interface-board.

The demands on the switching devices with respect to addressing of the individual memory banks and addresses is comparatively complex and can, especially in the case of higher system clock rates, lead to difficulties.

SUMMARY OF EMBODIMENTS OF THE INVENTION

An object of the present invention is to simplify the control of a single-chip DMD for the projection of a stereo-image.

This object is achieved in the case of a DLP-projector of the above-described type through application of at least a second driver circuit cooperating with a memory and by a switching device connected on one side with the two driver circuits and on its other side with at least the one DMD, with the first driver circuit processing image data of the first image channel and the second driver circuit processing image data of the second image channel, and with the switching device feeding to the DMD alternately one or more images or frames from the first driver circuit and one or more images or frames from the second driver circuit.

The term "switching device" is meant herein to include any switching system, with which a plurality of data sources can be switched to one or more data sinks. In the simplest case, the data of two driver circuits are alternately switched onto a data bus. Also included under the term, however, is also a switching system, by which more than two data sources can be switched onto one or more data sinks.

The term "signal inputs" is meant herein to include both inputs for analog signals, which are then convened to digital form, as well as also inputs for digital signals.

A core idea of the invention is to not process the image data of the first and second image channels in a first driver circuit, but, instead, to provide a driver circuit for each image channel, with the switching device caring for directing to the DMD, in a predetermined sequence, first the data of an image or frame of the first image channel of the first driver circuit and then the data of an image or frame of the second image channel of the second driver circuit. In this way, the inherent limitation of the system known from DE 1 016 01 60A1, in which the image data of both image channels must be processed by one driver circuit, is avoided, in that, now, the processing of the image data of the individual image channels occurs in parallel and the DMD is fed only thereafter, in sequential order.

The switching device is, in such case, significantly simplified, in that it then no longer has to control the cycle of reading and writing accesses to different memory banks, but, instead, only must connect the data lines of the data outputs of the different driver systems alternately with the DMD. An actuating of address regions is omitted completely in such case. Also the demands on the clocking of the switching device become smaller in this way, since it must now occur only in the rhythm of the image change at the DMD and, thus, in the case of DMDs of today, does not, as a rule, exceed 120 Hz. Finally, the data of, in each case, one image can be made available within two color-wheel rotations, because of the parallel processing of the data of the different image channels. In this way, a significantly more flicker-free projection of a series of stereoscopic images becomes possible, this meaning, as well, a better quality of the projection.

When the switching device, as provided in the system of the invention, is arranged only at the end of the image processing pipeline, then a maximum image frequency and quality of stereoscopic images to be actively presented with the DLP projector are possible. Also, it becomes possible with this type of system to direct, in simple manner, more than two image channels to the DMD, with, as required, also more DMDs being connectable to the data bus of the system, with the image channels then being distributable in sensible manner to the DMDs.

Basically, the image data of the image channels, thus, especially, the image data of the first and second, or right and left, image channels, can be received sequentially, one after the other, via exactly one signal input. In this case, the image data of the respective image channels must be distributed into the driver circuits via an appropriate logic assigned to the signal input. In order that a stereoscopic image, or image sequence, with stereoscopic images can be projected flicker-free, the logic for producing the image data, for example a computer with a graphics, or video, card, must be able to make the image data available sufficiently fast enough. It can, therefore, be of advantage to provide at least a second signal input, with the first signal input receiving the image signals of the first stereo channel and forwarding such into the first driver circuit, and the second signal input receiving the image signals of the second stereo channel and forwarding such into the second driver circuit. Thus, the data of the individual image channels can be directed to the DLP-projector in parallel with one another.

To the extent that the data of the respective image channels are directed synchronized to the DLP-projector, it is possible, as required, to omit a synchronizing of the image signals of the individual image channels. If such is not so, then it is necessary that the DLP-projector includes a clock mechanism for synchronizing the image signals. In such case, it can, for example, be of advantage to synchronize the signal inputs and/or the driver circuits with one another by use of a clock signal.

Another preferred form of embodiment provides a microprocessor, which controls the switching device and/or produces a control signal for shutter-glasses. Such a microprocessor is especially necessary, when the data of the respective image channels are sent to the DLP-projector unsynchronized or are not processed synchronously within the DLP-projector. If the synchronizing of the data of the image channels occurs outside of the projector in such a manner that also the switching clock of the switching device and thus of the image changes of the one or more DMDs can be derived therefrom, then also the control of shutter-glasses can be effected via a clock signal available outside of the DLP-projector for the synchronizing of the data, for example then, when a plurality of DLP-projectors are connected in parallel and a projector has an image change signal output, via which the parallel-connected projectors obtain the signal for image change for the respective switching devices.

The greatest color depth in the case of projection of stereoscopic images is currently obtainable with driver circuits based on an ASIC of type DDP 1000 of the firm Texas Instruments and such circuits are, for that reason, preferred.

The switching device can, fundamentally, connect all signal inputs and outputs of the DMD with the corresponding signal inputs and outputs of, in each case, one driver circuit, and then switch all signal lines over onto another driver circuit. It is simpler, however, when the switching device connects all signal lines with a first driver circuit and only switches the data lines of the DMD over onto the respective driver circuits.

In another preferred embodiment, for the projection of the image data of an image channel as a mono-image, or mono-image sequence, the switching device connects the data lines of the DMD over a desired period of time only with the corresponding data lines of one of the driver circuits. To this end, a control logic can, for example, be provided, which, via a corresponding input of a user of the projector, "freezes" the switch position of the switching device on one image channel, so that a mono-projection of the selected image channel occurs, as required, at full image repetition frequency of the DMD. A shutter-glasses can, via a correspondingly provided logic for this type of operation, be so controlled, that both "lenses" remain open, so that the observer can observe the mono-images with both eyes.

In reverse fashion, in another preferred type of operation, it can be provided that the images of an image channel can be played, or interspersed, over an arbitrarily short period of time, into an image sequence of another image channel. In this type of operation, it can be of advantage to control a shutter-glasses in such a manner that both "lenses" are closed during the projection of the images which were played, or interspersed, into the image sequence of the other image channel. A shutter-glasses control of this type can, for example, be of advantage, when, for example, in the projection of virtual worlds, three-dimensional objects located in the space are to be measured via the projection of the interspersed images onto these objects, without the observer having any indication that this is being done. The measurement of three-dimensional objects via a projection of grids onto these objects is, per se, within the ability of those skilled in the art and is not explained further here.

Finally, for reasons of simpler construction of the DLP-projector, it is of advantage to arrange the driver circuits and switching device on a circuit board.

BRIEF DESCRIPTION OF THE DRAWING

The invention will now be explained in greater detail on the basis of a block diagram in the sole FIGURE of the drawing presenting a preferred example of an embodiment of the invention.

DETAILED DESCRIPTION OF EMBODIMENTS OF THE INVENTION

FIG. 1 shows the individual circuit components needed for the electronic data processing of the image data. Provided as signal inputs are two interface boards 1, 1', which are connected in parallel with one another. Interface boards 1, 1' can alternatively receive analog or digital image data. Analog image data are converted into digital image data by A/D-converters on the interface boards 1, 1'.

The interface boards 1, 1' are synchronized via a synchronizing device 2, including a clock. In this, the image data of an image or frame of an image channel are buffered in a memory on the interface board and only read-out upon receipt of a synchronizing signal.

In the data flow direction, following each interface board 1, 1', a formatter hoard 3, 3' is arranged. Each formatter board 3, 3' receives from its foregoing interface board 1, 1' both digital image data and also a clock signal (Clock). On the formatter boards 3, 3' are driver circuits for controlling the DMD 4 downstream in the data flow direction. The driver circuits include, in each case, an ASIC 5, 5', as well as, in each case, a memory 6, 6' interacting with the ASIC 5, 5'.

The outputs of the formatter boards 1, 1' go to a switching device 7, which connects the data outputs of the formatter boards 3, 3' with the DMD.

A preferred ASIC for controlling the DMD is a DDP 1000 of the firm Texas Instruments.

The switching device 7 is so embodied, that all control lines of the ASIC 5, which are not image data lines and which are needed for control of the DMD 4, are looped through and are connected via the switching device 7 directly with the DMD 4. In contrast, the outputs of the ASIC 5, on which the image data are directed, are switched via the switching device to the DMD 4 in alternation with the data outputs of the ASIC 5' of the parallel-connected formatter board 3'.

The illustrated switching arrangement can be modified in many ways, without departing from the fundamental features of the invention. Thus, for example, other series-connected interface boards and formatter boards can be arranged in parallel with the illustrated boards, so that more than only two image channels can be processed and switched onto the DMD via a correspondingly modified switching device. The synchronizing of the image data processing does not have to occur on the interface boards; the formatter boards can also be synchronized directly via a clock, or a synchronizing in the electronics of the DLP-projector can be completely omitted, when the image data of the individual image channels are fed to the interface boards already in synchronized form. When the formatter boards are arranged on a circuit board, it can be sufficient or even especially advantageous, when two or more driver-circuit ASICs use a memory which they share together. Furthermore, a plurality of DMDs can be provided, so that the switching device distributes a number of M image channels to N DMDs.

What is claimed is:

1. A digital light processing (DLP) projector for the active projection of stereoscopic images, comprising:
    at least one digital mirror device (DMD),
    at least a first driver circuit interacting with a memory and configured for controlling the at least one DMD,
    at least a first signal input for the input of image data of at least a first image channel and a second image channel,
    at least a second driver circuit interacting with a memory; and
    a switching device, which is connected on one side with the two driver circuits and on another side with the at least one DMD;
    wherein the first driver circuit processes image data of the first image channel and the second driver circuit processes image data of the second image channel, and the switching device directs to the at least one DMD, alternately, one or more images or frames from the first driver circuit, and one or more images or frames from the second driver circuit, and
    wherein at least one of the first and second driver circuits comprises at least one DMD driver ASIC.

2. The DLP-projector as claimed in claim 1, further comprising at least a second signal input, wherein the first signal input receives the image signals of the first image channel and forwards such to the first driver circuit, and the second signal input receives the image signals of the second image channel and forwards such to the second driver circuit.

3. The DLP-projector as claimed in claim 1, further comprising a clock for synchronizing of the image signals.

4. The DLP-projector as claimed in claim 3, wherein the signal inputs are synchronized with one another by a clock signal.

5. The DLP-projector as claimed in claim 3 or claim 4, wherein the driver circuits are synchronized with one another by a clock signal.

6. The DLP-projector as claimed in claim 1, further comprising a microprocessor, which controls the switching device and/or produces a control signal for shutter-glasses.

7. The DLP-projector as claimed in claim 1, wherein the switching device connects all signal lines with the first driver circuit and data lines of the DMD only selectively with the first driver circuit or another driver circuit.

8. The DLP-projector as claimed in claim 1, wherein the switching device, for the projection of the image data of an image channel as a mono-image, or a mono-image sequence, connects the data lines of the at least one DMD during a desired period of time only with the corresponding data lines of one of the driver circuits.

9. The DLP-projector as claimed in claim 1, wherein the driver circuits and the switching device are arranged on a circuit board.

10. The DLP-projector as claimed in claim 1, wherein the DMD driver ASIC is a Texas Instruments DDP 1000 ASIC.

11. The DLP-projector as claimed in claim 1, wherein the switching device is configured to provide at least one control signal from the first driver circuit to the DMD.

* * * * *